United States Patent
Masuda

(10) Patent No.: US 8,656,064 B2
(45) Date of Patent: Feb. 18, 2014

(54) COMMUNICATION DEVICE AND COMMUNICATION METHOD

(75) Inventor: Masaya Masuda, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 13/240,996

(22) Filed: Sep. 22, 2011

(65) Prior Publication Data

US 2012/0195387 A1    Aug. 2, 2012

(30) Foreign Application Priority Data

Jan. 31, 2011    (JP) .................................. 2011-019237

(51) Int. Cl.
- G06F 3/00    (2006.01)
- G06F 13/12    (2006.01)
- G06F 13/38    (2006.01)

(52) U.S. Cl.
USPC ........... 710/14; 710/1; 710/8; 710/15; 710/62

(58) Field of Classification Search
USPC ........................................ 710/14, 1, 8, 15, 62
See application file for complete search history.

(56) References Cited

U.S. PATENT DOCUMENTS

| | | | | |
|---|---|---|---|---|
| 7,130,940 | B2 * | 10/2006 | Ikeda .............................. | 710/72 |
| 7,603,507 | B2 * | 10/2009 | Yagi et al. ..................... | 710/316 |
| 7,814,237 | B2 * | 10/2010 | Lee et al. ........................ | 710/14 |
| 8,069,271 | B2 * | 11/2011 | Brunet et al. .................... | 710/5 |
| 8,136,085 | B2 * | 3/2012 | Skillman et al. .............. | 717/100 |
| 2007/0081486 | A1 | 4/2007 | Koide | |
| 2008/0222316 | A1 * | 9/2008 | Sato ............................... | 710/16 |
| 2009/0193155 | A1 * | 7/2009 | Skillman et al. ................ | 710/14 |
| 2009/0307380 | A1 * | 12/2009 | Lee et al. ........................ | 710/14 |
| 2009/0307381 | A1 * | 12/2009 | Croyle et al. ................... | 710/14 |
| 2010/0281185 | A1 * | 11/2010 | Takayama ....................... | 710/14 |

FOREIGN PATENT DOCUMENTS

| | | |
|---|---|---|
| JP | 2004-112225 | 4/2004 |
| JP | 2004-180230 | 6/2004 |
| JP | 2007-110343 | 4/2007 |
| JP | 2009-218845 | 9/2009 |
| JP | 2010-088101 | 4/2010 |

OTHER PUBLICATIONS

Japanese Patent Application No. 2011-019237; Notification of Reasons for Refusal; Mailed Jun. 5, 2012 (with English translation).
Japanese Patent Application No. 2011-019237; Notification of Reasons for Refusal; Mailed Feb. 7, 2012 (with English translation).

* cited by examiner

*Primary Examiner* — Idriss N Alrobaye
*Assistant Examiner* — Getente A Yimer
(74) *Attorney, Agent, or Firm* — Blakely, Sokoloff, Taylor & Zafman LLP

(57) ABSTRACT

There is provided a communication device. The communication device includes: a first communication module configured to detect an external communication device in accordance with a first communication mode and communicate with the detected external communication device in accordance with the first communication mode; a second communication module configured to detect an external communication device in accordance with a second communication mode and communicate with the detected external communication device in accordance with the second communication mode, wherein power consumption of the second communication mode is lower than that of the first communication mode; a controller configured to: i) cause the second communication module to detect the external communication device in accordance with the second communication mode; and ii) connect the first communication module to the external communication device detected by the second communication module in accordance with the first communication mode.

5 Claims, 8 Drawing Sheets

COMMUNICATION DEVICE AND COMMUNICATION METHOD

CROSS-REFERENCE TO RELATED APPLICATION

This application claims priority from Japanese Patent Application No. 2011-019237, filed on Jan. 31, 2011, the entire contents of which are hereby incorporated by reference.

BACKGROUND

1. Field

Embodiments described herein relate to a communication device and a communication method.

2. Related Art

Various communication modes have come into wide use with the advance of communication technology in recent years. As the communication modes, there are many communication modes in consideration of communication purposes such as a communication mode capable of executing communication in low power consumption, a communication mode capable of executing communication at a high speed, etc.

BRIEF DESCRIPTION OF DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided a communication device. The communication device includes: a first communication module configured to detect an external communication device in accordance with a first communication mode and communicate with the detected external communication device in accordance with the first communication mode; a second communication module configured to detect an external communication device in accordance with a second communication mode and communicate with the detected external communication device in accordance with the second communication mode, wherein power consumption of the second communication mode is lower than that of the first communication mode; a controller configured to: i) cause the second communication module to detect the external communication device in accordance with the second communication mode; and ii) connect the first communication module to the external communication device detected by the second communication module in accordance with the first communication mode.

Exemplary embodiments of the invention will be now described below with reference to the drawings.

Figure 1:
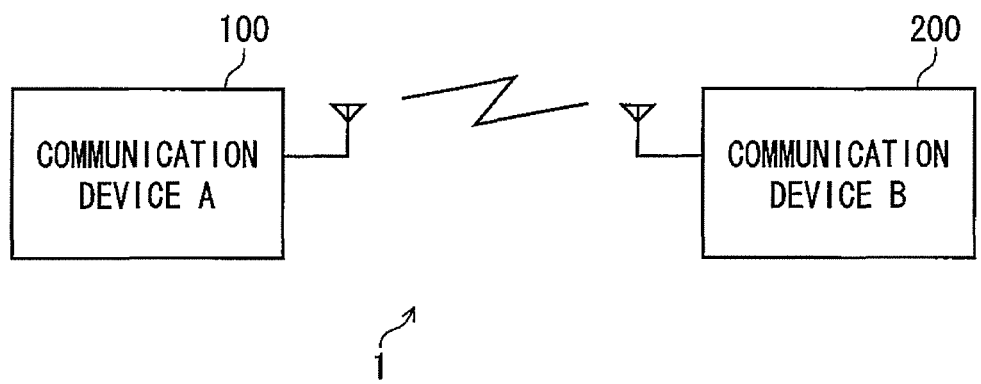
FIG. 1 is a conceptual diagram showing an example of a communication system in an exemplary embodiment of the invention.

FIG. 1 is a conceptual diagram showing an example of a communication system 1 in the exemplary embodiment. A communication device A 100 and a communication device B 200 are shown in FIG. 1.

The communication device A 100 and the communication device B 200 communicate with each other by wireless. In this exemplary embodiment, assume that the communication device A 100 and the communication device B 200 communicate with each other, for example, in accordance with a Bluetooth communication protocol. Various kinds of electronic devices such as PC (Personal Computer), cellular phone, mobile device (e.g. Slate PC, etc.), DTV (Digital Television), etc. can be regarded as examples of the communication device A 100 and the communication device B 200.

Figure 2:
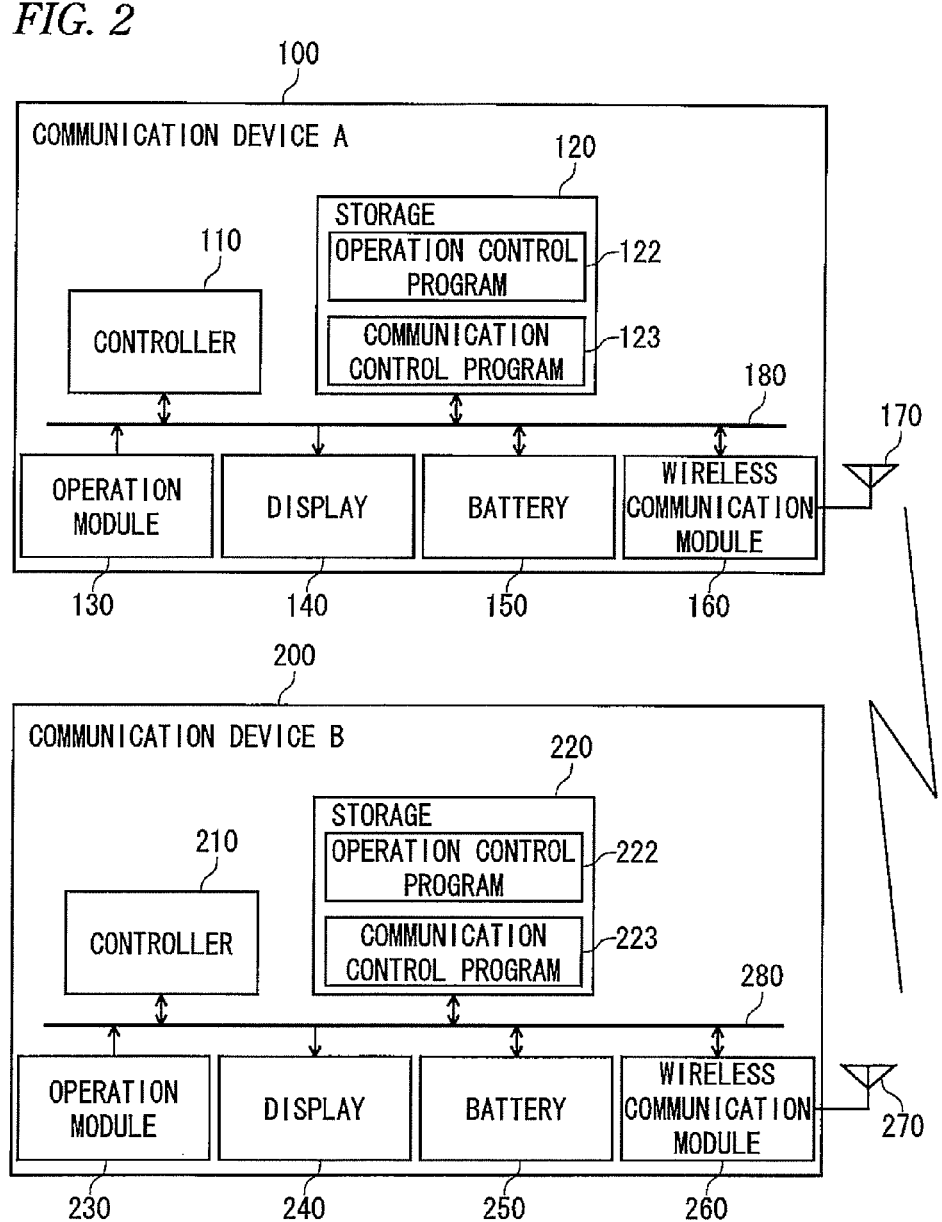
FIG. 2 is a block diagram showing an example of internal configuration of communication devices A and B in the exemplary embodiment.

FIG. 2 is a block diagram showing an example of internal configuration of the communication device A 100 in the exemplary embodiment.

The communication device A 100 includes a controller 110, a storage 120, an operation module 130, a display 140, a battery 150, a wireless communication module 160, an antenna 170, and a bus 180. The communication device B 200 includes a controller 210, a storage 220, an operation module 230, a display 240, a battery 250, a wireless communication module 260, an antenna 270, and a bus 280. The communication device A 100 and the communication device B 200 have substantially the same internal configuration. Modules referred to as the same names have substantially the same functions. The following description will be focused on the communication device A 100 while description on the communication device B 200 will be omitted. However, the description is simply one instance in this exemplary embodiment and the invention is not necessarily limited thereto. For example, the communication device B 200 may not have the same internal configuration as that of the communication device A 100 as long as the communication device B 200 can communicate with the communication device A 100 by wireless.

For example, the controller 110 is a CPU (Central Processing Unit) which generally controls the communication device A 100 and which has a function of executing predetermined processing in accordance with a program stored in the storage 120.

For example, the storage 120 is a semiconductor storage device which stores various kinds of programs executed by the controller 110, various kinds of information necessary for predetermined processing, various kinds of data files, and so on. The storage 120 further stores an operation control program 122 and a communication control program 123. The controller 110 can generally control the communication device A 100 by executing the operation control program 122 and can control Bluetooth communication by executing the communication control program 123.

For example, the operation module 130 is an operation receiver such as a keyboard, a touch panel, etc. through which a user inputs an operation into the communication device A 100. The operation module 130 gives a user's operation input as a predetermined electric signal to the communication device A 100. Although a keyboard, a touch panel or the like have been taken as examples of the operation module 130 in this exemplary embodiment, the operation module 130 is not limited thereto. For example, the operation module 130 may include a signal receiver or the like which receives a signal from an external remote controller on which the user inputs an operation.

For example, the display 140 is a display device such as a liquid crystal display or a self-emitting display which has a function of displaying an image.

For example, the battery 150 is a storage battery which has a function of storing supplied electric power. The communication device A 100 is driven by the battery 150.

The wireless communication module 160 has a function of a communication module which transmits/receives electric wave through the antenna 170 to communicate with another communication device (e.g. the communication device B 200) by wireless.

The bus 180 has a function of communicably connecting the respective modules internally connected in the communication device A 100.

In this exemplary embodiment, the communication device A 100 and the communication device B 200 performed wireless communication in accordance with the Bluetooth standard. However, this is simply one instance in this exemplary embodiment, and the embodiment of the invention is not limited thereto. The communication device A 100 and the communication device B 200 may communicate with each other based on another communication standard.

Addition of each communication specification (communication mode) is made by version upgrade of the Bluetooth standard. In Bluetooth v.3.0+HS, AMP (Alternate MAC/PHY) which enables high-speed communication but requires higher power consumption compared with BR (Basic Rate)/EDR (Enhanced Data Rate) has been introduced in addition to a communication specification (communication mode) of BR/EDR up to Bluetooth v.2.0+EDR. In Bluetooth v.4.0, a communication specification (communication mode) of LE (Low Energy) which can suppress power consumption but lower the speed of communication compared with BR/EDR has been introduced. Details of functions and procedures essential to interconnectivity are defined in the Bluetooth standard.

The communication device A 100 starts communication with the communication device B 200 based on user's operation from the operation module 130 or automatically. On this occasion, the controller 110 controls this communication by executing the communication control program 123 stored in the storage 120. The wireless communication module 160 performs wireless communication based on the communication control performed by the controller 110.

Communication modes will be described below with reference to FIG. 3.

Figure 3:
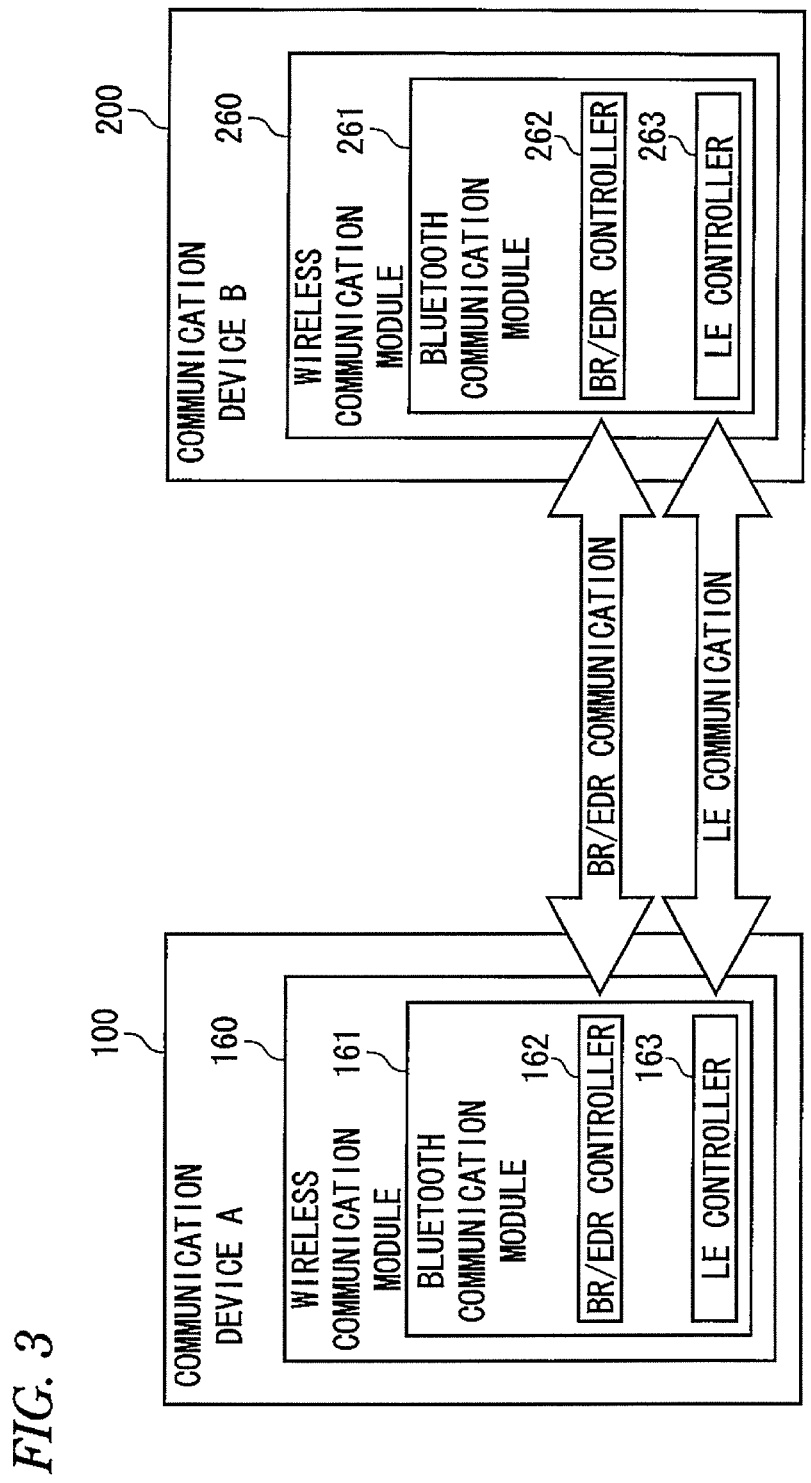
FIG. 3 is a conceptual diagram showing examples of communication modes for the communication devices A and 13 in the exemplary embodiment.

FIG. 3 is a conceptual diagram showing examples of communication modes between the communication device A 100 and the communication device B 200 in this exemplary embodiment.

The wireless communication module 160 of the communication device A 100 has a Bluetooth communication module 161.

The Bluetooth communication module 161 is a communication module which performs communication in accordance with the Bluetooth standard. The Bluetooth communication module 161 has a BR/EDR controller 162, and an LE controller 163. That is, the communication device A 100 is a so-called dual mode device which supports both BR/EDR and LE.

The BR/EDR controller 162 is a communication controller which operates in accordance with a communication specification (communication mode) of BR (Basic Rate)/EDR (Enhanced Data Rate) defined in Bluetooth v.2.0+EDR.

The LE controller 163 is a communication controller which operates in accordance with a communication specification (communication mode) of LE (Low Energy) defined in Bluetooth v.4.0.

The communication device B 200 has the same configuration as that of the communication device A 100. The communication device A 100 and the communication device B 200 can perform Bluetooth communication with each other based on the communication specifications (communication modes) of BR/EDR and LE (dual mode devices).

Here, the exemplary embodiment will be described in the case where the communication device A 100 and the communication device B 200 perform communication connection only in accordance with the BR/EDR mode. The case where the communication device A 100 requests the communication device B 200 to connect with each other is taken here as an example.

Figure 4:
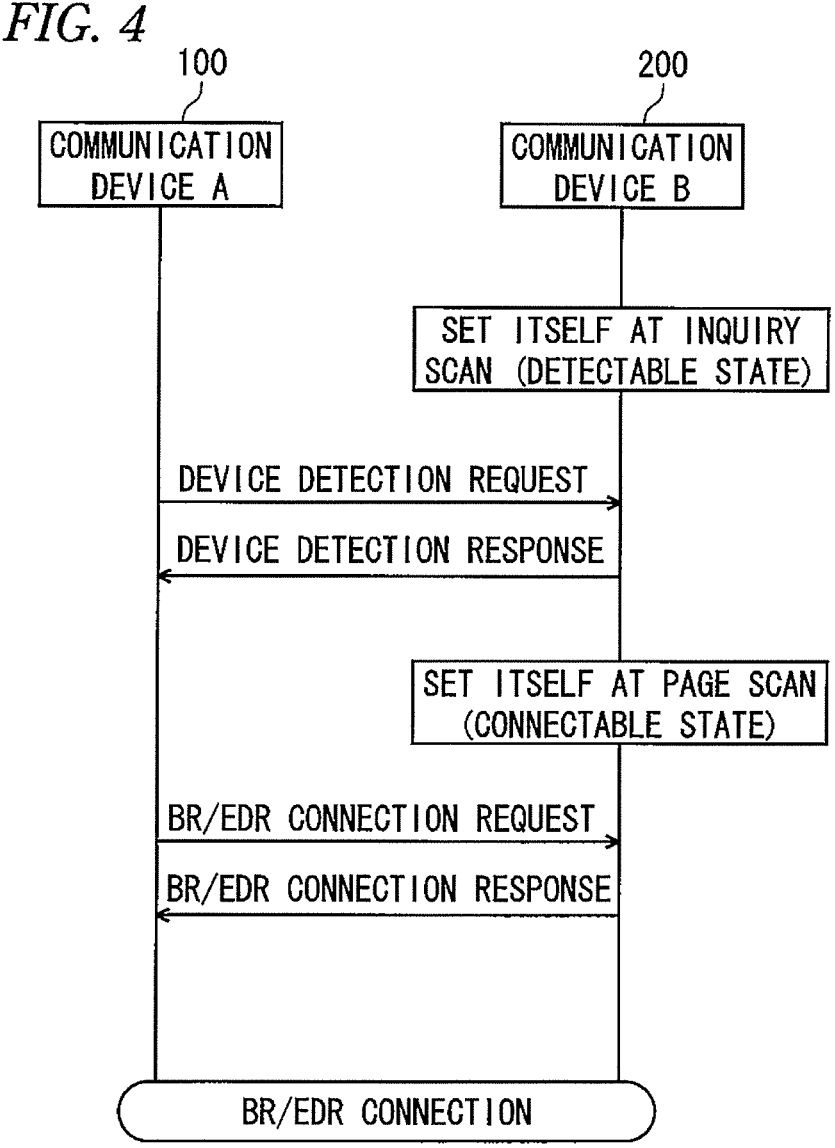
FIG. 4 is a diagram showing an example of a processing sequence when the communication devices A and B in the exemplary embodiment perform connection only in accordance with the BR/EDR mode.

FIG. 4 is a diagram showing an example of a processing sequence when the communication device A 100 and the communication device B 200 in the exemplary embodiment perform connection only in accordance with the BR/EDR mode.

First, the communication device B 200 receiving a connection request sets itself at Inquiry Scan (discoverable mode) so that the communication device B 200 is enabled to accept a device discover request from another communication device.

The communication device A 100 first transmits a device discover request (packet) to its surroundings to check whether there is any discoverable device around the communication device A 100.

The communication device B 200 set at Inquiry Scan (discoverable mode) and receiving the device discover request (packet) confirms the device discover request (packet) and transmits a device discover response (packet) to the communication device A 100. After transmission of the device discover response (packet), the communication device B 200 sets itself at Page Scan (connectable mode) so that the communication device B 200 is enabled to accept a BR/EDR connection request from the communication device A 100.

Upon reception of the device discover response from the communication device B 200, the communication device A 100 transmits a BR/EDR connection request to the communication device B 200 when the communication device A 100 wants to start connection to the communication device B 200.

Upon reception of the BR/EDR connection request from the communication device A 100, the communication device B 200 transmits a BR/EDR connection response to the communication device A 100.

In accordance with the aforementioned sequence, the communication device A 100 and the communication device B 200 can establish communication in the BR/EDR mode.

This exemplary embodiment will be described next in the case where the communication device A 100 and the communication device B 200 perform connection only in accordance with the LE mode. The case where the communication device A 100 requests the communication device B 200 to connect with each other is taken here as an example, similarly to the above description.

Figure 5:
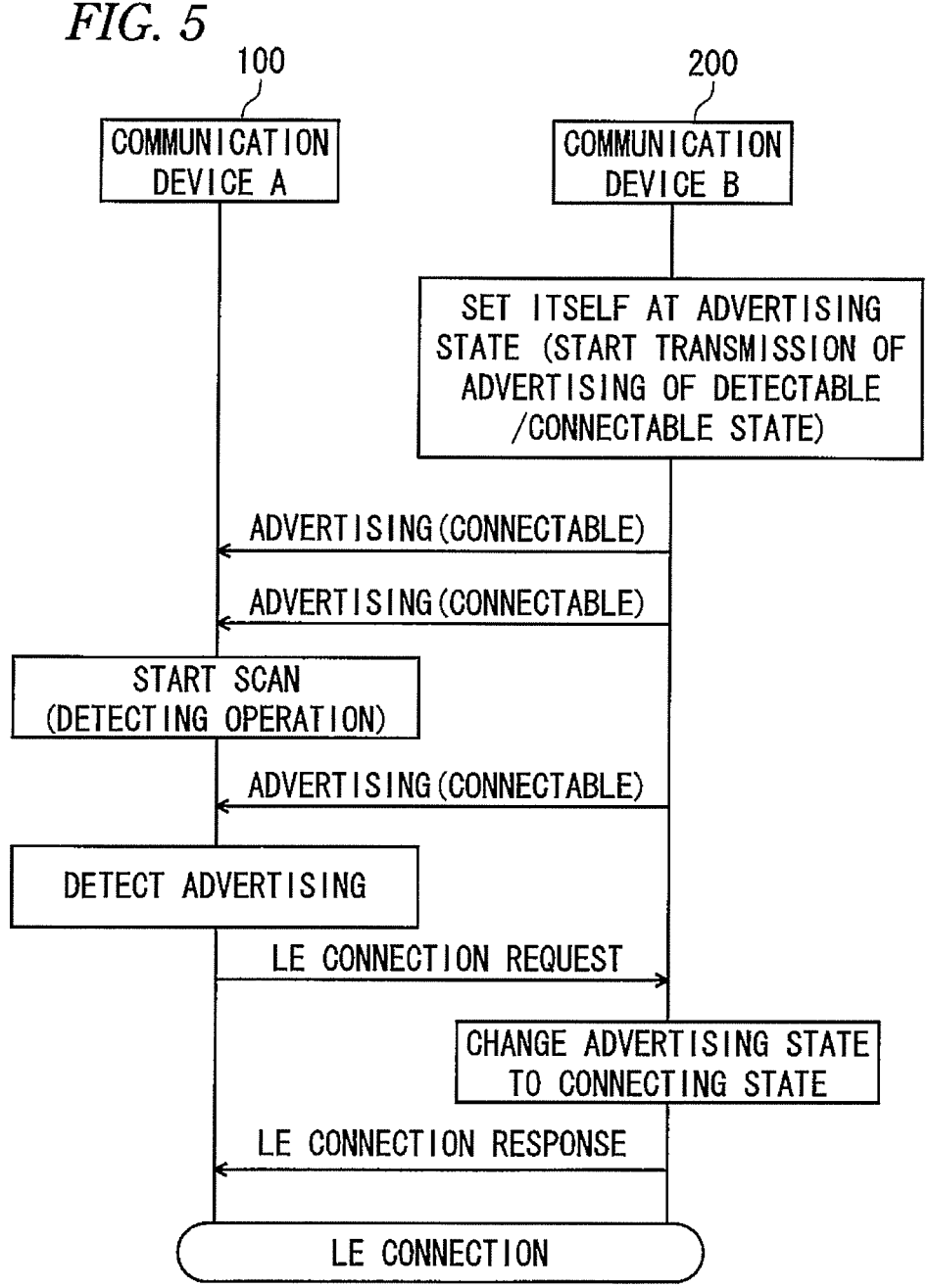
FIG. 5 is a diagram showing an example of a processing sequence when the communication devices A and B in the exemplary embodiment perform connection only in accordance with the LE mode.

FIG. 5 is a diagram showing an example of a processing sequence when the communication device A 100 and the communication device B 200 in the exemplary embodiment perform connection only in accordance with the LE mode.

In the LE mode, the communication device B 200 receiving a connection request sets itself at an Advertising state. That is, the communication device B 200 sets itself at the Advertising state to receive an LE connection request and starts transmission of advertising (Advertising packet) of a discoverable/connectable state. After the transmission starts, the communication device B 200 continuously transmits Advertising (connectable) as advertising (Advertising packet) of a discoverable/connectable state to its surroundings.

On the other hand, the communication device A 100 transmitting a connection request first starts Scan (detecting operation) to detect Advertising (connectable) when the communication device A 100 wants to request connection in the LE mode. When the communication device A 100 detects Advertising (connectable) as advertising (packet) of a discoverable/connectable state from an external device after start of the Scan (discover operation) and wants to start connection to the device, the communication device A 100 specifies the device (the communication device B 200 in this example) transmitting the Advertising (connectable) based on information included in the Advertising (connectable) and transmits an LE connection request to the specified device.

Upon reception of the LE connection request from another device (the connection device A 100 in this example), the communication device B 200 changes the Advertising state to a Connecting state and transmits an LE connection response to the connection device A 100 which will perform connection.

In accordance with the aforementioned sequence, the communication device A 100 and the communication device B 200 can establish communication in the LE mode.

When devices each having both BR/EDR and LE perform communication by using a protocol/profile unprescribed (forbidden) for communication on LE, the devices have to perform a wireless communication process on BR/EDR which has been used in the background art. That is, when the devices use the protocol/profile for communication on only BR/EDR, the device initiating connection performs discovery and connection on BR/EDR while the device receiving connection stands by to be discovered/connected on BR/EDR. The devices each having both BR/EDR and LE may consume larger power compared with the case of the background art regardless of use of Bluetooth v4.0 specification characterized in power saving if the device having both BR/EDR and serving as a side receiving connection stands by to be detected/connected on LE at the same time.

Therefore, in this exemplary embodiment, a low power consumption communication method is achieved using both communication sequences in the LE mode and the BR/EDR mode when devices perform communication by use of a protocol/profile (or service) prescribed (permitted) for communication on BR/EDR but unprescribed (forbidden) for communication on LE.

A connection process (and its preceding process) using both the communication modes of the LE mode and the BR/EDR mode in this exemplary embodiment will be described below.

Figure 6:
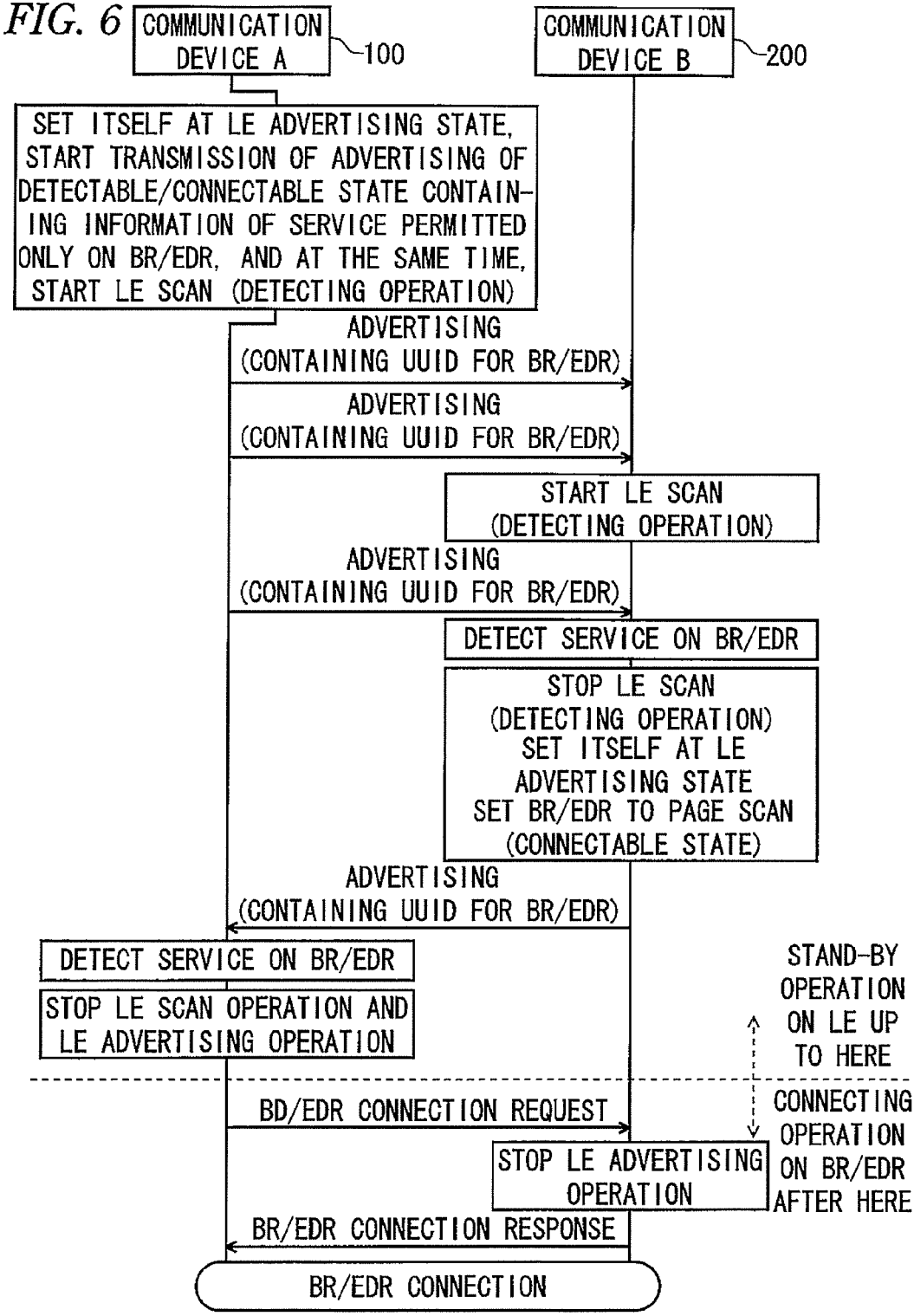
FIG. 6 is a diagram showing an example of a processing sequence when the communication devices A and B in the exemplary embodiment perform connection by use of both the LE mode and the BR/EDR mode.

FIG. 6 is a diagram showing an example of a processing sequence when the communication device A 100 and the communication device B 200 in the exemplary embodiment use both the communication modes of the LE mode and the BR/EDR mode to perform connection.

First, the communication device A 100 transmitting a connection request for communication using a protocol/profile prescribed (permitted) for communication on BR/EDR but unprescribed (forbidden) for communication on LE sets itself at an LE Advertising state and starts transmission of advertising (Advertising packet) of a discoverable/connectable state containing information of a service prescribed (permitted) on BR/EDR but unprescribed (forbidden) on LE. At the same time, the communication device A 100 starts LE Scan (discover operation).

When communication is performed only in accordance with the LE mode, UUID (Universally Unique Identifier) indicating a service (service prescribed on LE) to be executed in the future is usually written in a predetermined position of an Advertising packet as advertising of a discoverable/connectable state. However, the communication device A 100 writes UUID indicating a service as information of the service prescribed (permitted) on BR/EDR but unprescribed (forbidden) on LE in the aforementioned predetermined position in advertising (Advertising packet) of a discoverable/connectable state and transmits this advertising (Advertising packet). As a result, the communication device B 200 as a device on a side receiving connection can receive the advertising (Advertising packet) of the discovarable/connectable state to thereby specify the service on BR/EDR the communication device A 100 wants to use.

The communication device B 200 starts LE Scan (discover operation). Upon reception of the Advertising packet (containing the UUID for BR/EDR) as the advertising transmitted from the communication device A 100, the communication device B 200 can detect the UUID indicating the service on BR/EDR from the Advertising packet. Upon detection of the UUID indicating the service on BR/EDR, the communication device B 200 determines that the communication device A 100 wants to use the service on BR/EDR indicated by the UUID.

Then, the communication device B 200 stops LE Scan (discover operation) and sets itself at an LE Advertising state. Then, the communication device B 200 starts transmission of advertising (Advertising packet) of a discoverable/connectable state containing the UUID written in the received Advertising packet and sets itself at BR/EDR Page Scan (connectable state) so that the communication device B 200 is enabled to accept a BR/EDR connection request from the communication device A 100.

When the communication device A 100 receives the Advertising packet and detects the UUID (UUID indicating the service on BR/EDR) written in the Advertising packet transmitted by the communication device A 100 itself from the received Advertising packet, the communication device A 100 can determine that the device transmitting the Advertising packet is a device transmitting the Advertising packet in accordance with the Advertising packet transmitted by the communication device A 100 itself. Then, the communication device A 100 stops the LE Advertising operation and the LE Scan (discover operation).

Then, the communication device A 100 transmits a BR/EDR connection request to the communication device B 200.

Upon reception of the BR/EDR connection request, the communication device B 200 stops the LE Advertising operation and transmits a BR/EDR connection response to the communication device A 100.

In accordance with the aforementioned sequence, both the communication modes of the LE mode and the BR/EDR mode can be used for executing a connection process in the BR/DER mode. After BR/EDR connection is established, it is possible to use the service prescribed (permitted) on BR/EDR but unprescribed (forbidden) on LE.

A process executed by the communication device A 100 at the time of execution of the aforementioned connection process (and its preceding process) will be described below.

Figure 7:
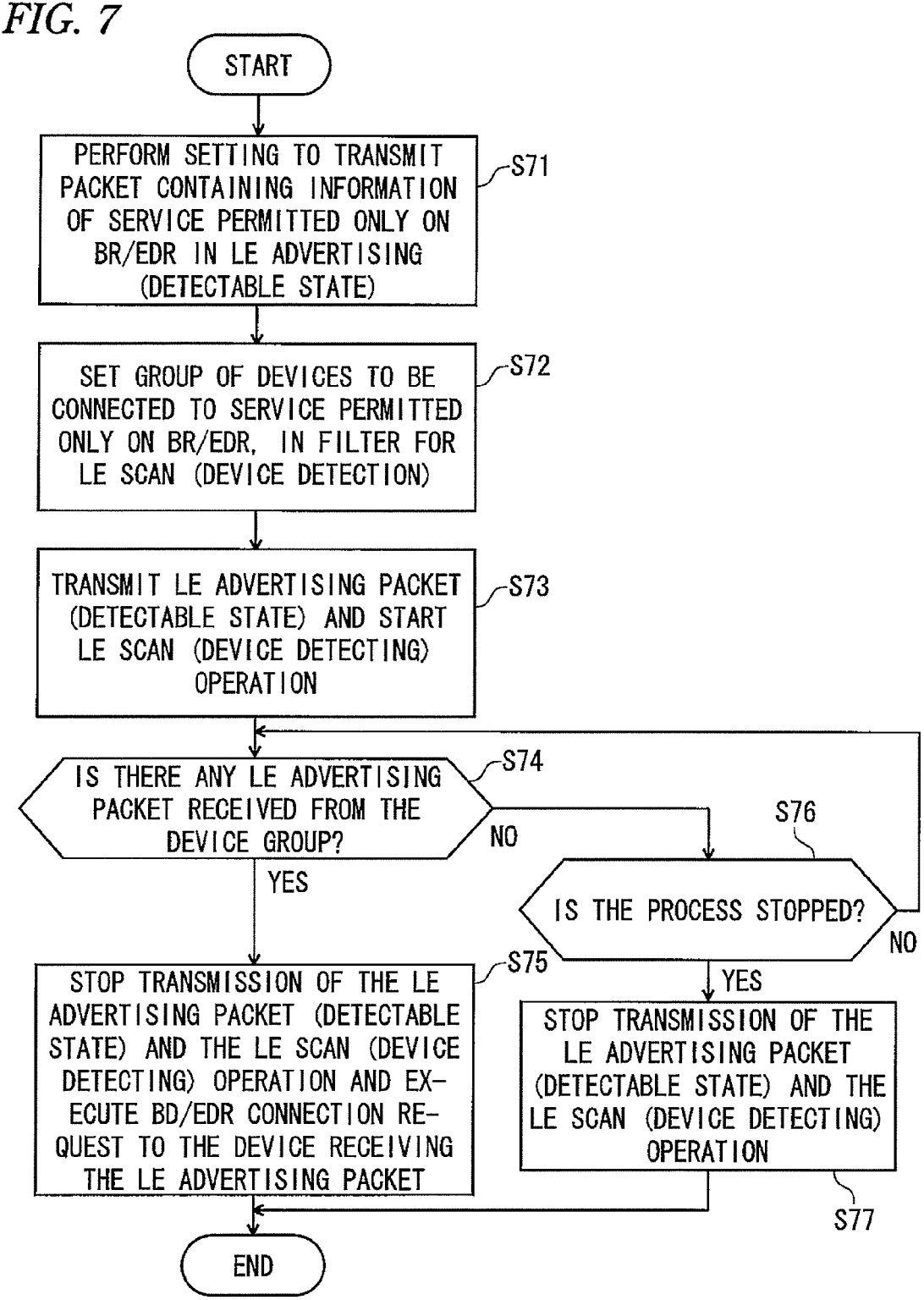
FIG. 7 is a flow chart showing an example of a processing flow in the communication device A in the exemplary embodiment.

FIG. 7 is a flow chart showing an example of a processing flow in the communication device A 100 in this exemplary embodiment.

First, the controller 110 of the communication device A 100 performs setting to transmit advertising (Advertising packet) of a discoverable/connectable state (containing UUID written in a predetermined position) containing information of a service prescribed (permitted) on BR/EDR but unprescribed (forbidden) on LE (step S71) in the LE Advertising state (detectable state).

Then, the controller 110 sets a group of devices to be connected to the aforementioned service, in a filter for LE Scan (device detection) (step S72).

After the step S72 is completed, the controller 110 controls the wireless communication module 160 to set an LE Advertising state, transmits an LE Advertising packet and starts an LE Scan (device detection) operation (step S73).

Then, the controller 110 determines whether there is any LE Advertising packet received from the group of devices to be connected, which group is set in a filter in the step S72 (step S74).

When there is any LE Advertising packet received in the step S74 (step S74: Yes), the controller 110 controls the wireless communication module 160 to stop setting of the LE Advertising state, transmission of the LE Advertising packet and the LE Scan (device detection) operation, then transmit a BR/EDR connection request to the device transmitting the received LE Advertising packet (step S75).

When there is no LE Advertising packet received in the step S74 (step S74: No), the controller 110 determines whether the process is stopped by a user's instruction, timeout, etc. or not (step S76). When the process is not stopped (step S76: No), the processing flow goes back to the step S74.

When the process is stopped in the step S76 (step 76: Yes), the controller 110 controls the wireless communication module 160 to stop setting of the LE Advertising state, transmission of the LE Advertising packet and the LE Scan (device detection) operation (step S77).

After the step S75 or the step S77 is completed, a series of processing flow for starting connection on BR/EDR is terminated.

A process executed by the communication device B 200 at the time of execution of the aforementioned connection process (and its preceding process) will be described below.

Figure 8:
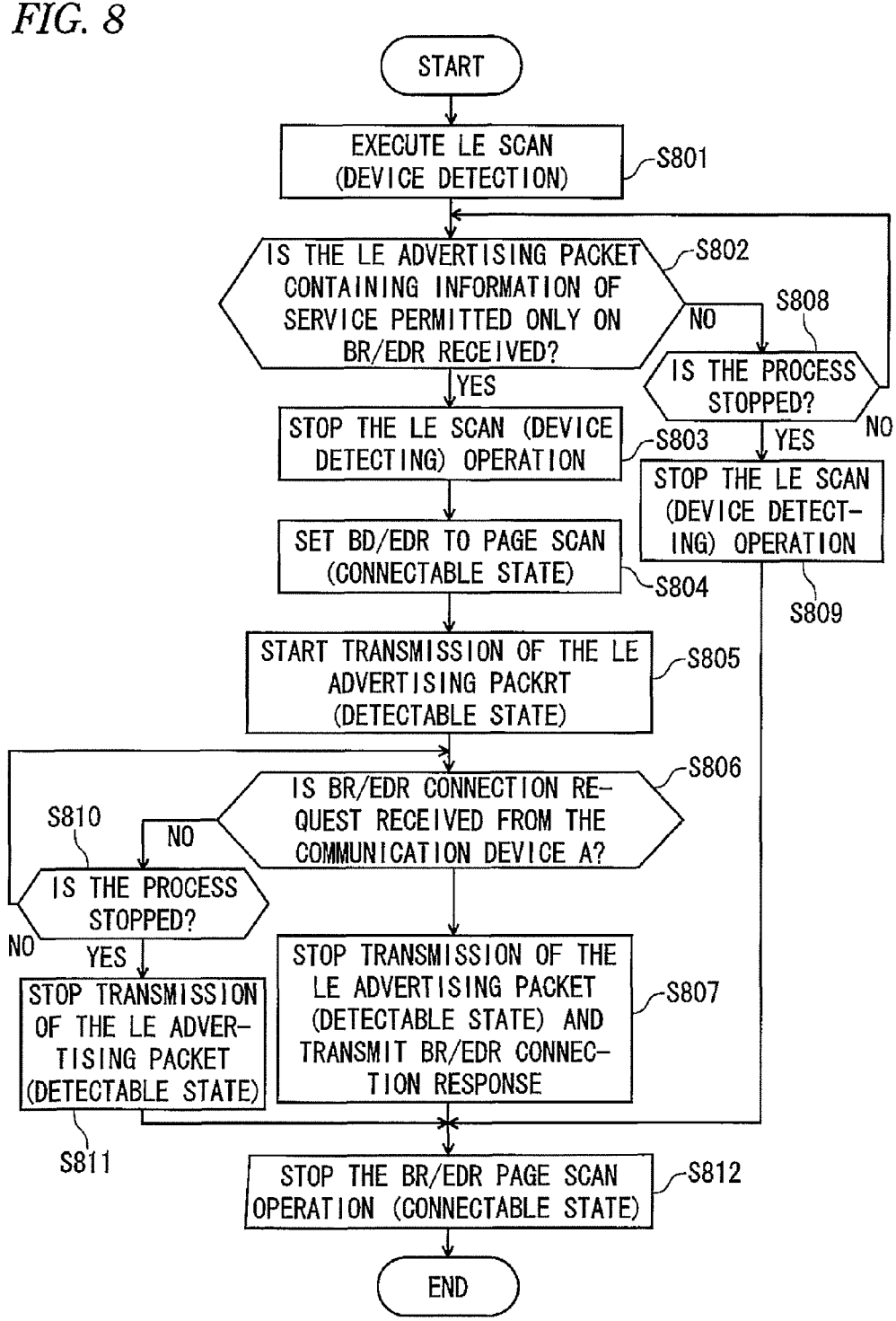
FIG. 8 is a flow chart showing an example of a processing flow in the communication device B in the exemplary embodiment.

FIG. 8 is a flow chart showing an example of a processing flow in the communication device B 200 in this exemplary embodiment.

First, the controller 210 of the communication device B 200 executes LE Scan (device detection) (step S801).

Then, the controller 210 determines whether advertising (Advertising packet) of a discoverable/connectable state (containing UUID written in a predetermined position) containing information of a service prescribed (permitted) on BR/EDR but unprescribed (forbidden) on LE is received or not (step S802).

When the Advertising packet containing the information of the service prescribed (permitted) on BR/EDR but unprescribed (forbidden) on LE is received in the step S802 (step S802: Yes), the controller 210 stops the LE Scan (device detection) operation (step S803).

Then, the controller 210 sets BR/EDR to Page Scan (connectable state) (step S804) so that the communication device B 200 is enabled to accept a BR/EDR connection request from the communication device A 100.

After the step S804 is completed, the controller 210 starts transmission of an LE Advertising packet in which the UUID indicated by the received Advertising packet is written (step S805).

Then, the controller 210 determines whether there is any BR/EDR connection request received from the communication device A 100 or not (step S806).

When there is any BR/EDR connection request received from the communication device A 100 in the step S806 (step S806: Yes), the controller 210 stops transmission of the LE Advertising packet and transmits a BR/EDR connection response to the communication device A 100 (step S807).

When the Advertising packet containing the information of the service prescribed (permitted) on BR/EDR but unprescribed (forbidden) on LE is not received in the step S802 (step S802: No), the controller 210 determines whether the process is stopped by a user's instruction, timeout, etc. or not (step S808).

When the process is not stopped in the step S808 (step 808: No), the processing flow goes back to the step S802. When the process is stopped in the step S808 (step S808: Yes), the controller 210 stops the LE Scan (device detection) operation (step S809).

When there is no BR/EDR connection request received from the communication device A 100 in the step S806 (step S806: No), the controller 210 determines whether the process is stopped by a user's instruction, timeout, etc. or not (step S810).

When the process is not stopped in the step S810 (step 810: No), the processing flow goes back to the step S806. When the process is stopped in the step S810 (step S810: Yes), the controller 210 stops transmission of the LE Advertising packet (step S811).

After the step S807, the step S809 or the step S811 is completed, the BR/EDR Page Scan operation (connectable state) is stopped in step S812 and the processing flow is terminated.

In this exemplary embodiment, because the LE mode is used for device detection when connection in the BR/EDR mode is executed by use of both the communication modes of the LE mode and the BR/EDR mode, power saving can be achieved compared with the case where connection only in the BR/EDR mode is executed.

Moreover, because dual mode devices need not stand by to be discovered/connected state on both BR/EDR and LE, power saving can be achieved.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed us:

1. A communication device comprising:
   a first communication module configured to detect an external communication device in accordance with a first communication mode and communicate with the detected external communication device;

a second communication module configured to detect the external communication device in accordance with a second communication mode and communicate with the detected external communication device, wherein power consumption of the second communication mode is lower than that of the first communication mode in detecting the external communication device;

a controller configured to cause the second communication module to detect the external communication device in accordance with the second communication mode, and then connect the first communication module to the external communication device detected by the second communication module, wherein the controller causing (i) transmission of an advertising indicating that the communication device is detectable in the second communication mode and including information specifying that a service available in the first communication mode is unavailable in the second communication mode, and (ii) causing the second communication module to detect the external communication device in accordance with the second communication mode, and then upon receiving an advertising by the second communication module indicating that the communication device is detectable in the second communication mode and including information indicating a service available in the first communication mode is unavailable in the second communication mode, the controller causing the first communication module to transmit a connection request in the first communication mode to the external connection device.

2. The device of claim 1, wherein the first communication module uses the service in the connection established by the first communication mode.

3. The device of claim 1, wherein the first communication mode and the second communication mode comply with Bluetooth Standard.

4. The device of claim 1, wherein the first communication module and the second communication module communicate with the detected external communication device wirelessly.

5. A communication method that detects an external communication device by a second communication mode and communicates with the external communication device detected by the second communication mode using a first communication mode, wherein power consumption of the second communication mode is lower than that of the first communication mode in detecting the external communication device, the method comprising:

transmitting, from a communication device to the external communication device, an advertising indicating that the communication device is detectable in the second communication mode and including information specifying that a service available in the first communication mode is unavailable in the second communication mode;

detecting the external communication device by the second communication mode; and when receiving an advertising indicating that the communication device is detectable in the second communication mode and including information indicating a service available in the first communication mode unavailable in the second communication mode, transmitting a connection request in the first communication mode from the communication device to the external communication device.

\* \* \* \* \*